(12) United States Patent
Kato et al.

(10) Patent No.: US 9,440,634 B2
(45) Date of Patent: Sep. 13, 2016

(54) CONTROL DEVICE FOR VEHICLE AND METHOD OF CONTROLLING VEHICLE

(71) Applicant: TOYOTA JIDOSHA KABUSHIKI KAISHA, Toyota-shi (JP)

(72) Inventors: Shinji Kato, Toyota (JP); Satoshi Yamanaka, Susono (JP); Hideaki Otsubo, Aichi-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/721,486

(22) Filed: May 26, 2015

(65) Prior Publication Data

US 2015/0353091 A1 Dec. 10, 2015

(30) Foreign Application Priority Data

Jun. 9, 2014 (JP) ................. 2014-118988

(51) Int. Cl.
| | |
|---|---|
| *B60W 10/02* | (2006.01) |
| *B60W 50/08* | (2012.01) |
| *B60W 10/06* | (2006.01) |
| *B60W 30/18* | (2012.01) |
| *B60W 30/182* | (2012.01) |

(52) U.S. Cl.
CPC ............ *B60W 10/02* (2013.01); *B60W 10/06* (2013.01); *B60W 30/182* (2013.01); *B60W 30/18072* (2013.01); *B60W 50/082* (2013.01); *B60W 2030/1809* (2013.01); *B60W 2030/18081* (2013.01); *B60W 2540/10* (2013.01); *B60W 2540/103* (2013.01); *B60W 2710/021* (2013.01); *B60W 2710/0627* (2013.01); *B60W 2710/0644* (2013.01); *B60W 2720/106* (2013.01); *Y10T 477/75* (2015.01)

(58) Field of Classification Search
None
See application file for complete search history.

(56) References Cited

U.S. PATENT DOCUMENTS

| | | | |
|---|---|---|---|
| 6,309,325 B1 * | 10/2001 | Baer | B60W 10/02 477/166 |
| 7,637,842 B2 * | 12/2009 | Tamai | B60K 6/48 477/168 |
| 9,267,448 B2 * | 2/2016 | Kuroki | F02D 41/0087 |
| 2015/0353086 A1 | 12/2015 | Kato et al. | |

FOREIGN PATENT DOCUMENTS

| | | |
|---|---|---|
| JP | 8-67174 | 3/1996 |
| JP | 2010-203544 | 9/2010 |
| JP | 2012-030710 | 2/2012 |

(Continued)

*Primary Examiner* — Dirk Wright
(74) *Attorney, Agent, or Firm* — Oblon, McClelland, Maier & Neustadt, L.L.P

(57) ABSTRACT

A control device for a vehicle includes a control unit configured to: implement a first travelling mode of engaging a power connecting/disconnecting device at a time an accelerator opening is greater than a fully closed state and not greater than a first opening; implement a second travelling mode of releasing the power connecting/disconnecting device at a time the accelerator opening is greater than the first opening and smaller than a second opening; implement a third travelling mode of stopping a fuel supply to an engine with the power connecting/disconnecting device engaged at a time the accelerator opening is fully closed; and control an output of the engine so that a vehicle deceleration at a time of implementing the first travelling mode gradually changes.

5 Claims, 4 Drawing Sheets

(56) References Cited

FOREIGN PATENT DOCUMENTS

| JP | 2012-036912 | 2/2012 |
| JP | 2012-117424 | 6/2012 |
| JP | 2013-096518 | 5/2013 |
| JP | 2015-231767 A | 12/2015 |
| WO | WO 2013/030920 A1 | 3/2013 |

* cited by examiner

CONTROL DEVICE FOR VEHICLE AND METHOD OF CONTROLLING VEHICLE

CROSS-REFERENCE TO RELATED APPLICATION

The present application claims priority to and incorporates by reference the entire contents of Japanese Patent Application No. 2014-118988 filed in Japan on Jun. 9, 2014.

BACKGROUND OF THE INVENTION

1. Field of the Invention

The present invention relates to a control device for a vehicle and a method of controlling a vehicle that enable a vehicle to travel through inertia by blocking power transmission between an engine and drive wheels.

2. Description of the Related Art

A vehicle that carries out a control related this type of travelling through inertia is conventionally known. In such control, a power connecting/disconnecting device between an engine and drive wheels is released to block the power transmission between the engine and the drive wheels during the travelling, as in the techniques disclosed in Japanese Patent Application Laid-open No. 2012-030710 and International Publication Pamphlet No. WO 2013/030920, for example. In the technique disclosed in Japanese Patent Application Laid-open No. 2012-030710, a clutch serving as a power connecting/disconnecting device is released to start the traveling through inertia when an output torque of the engine enters a negative region while the accelerator opening is reducing. In the technique disclosed in International Publication Pamphlet No. WO 2013/030920, fuel efficiency is enhanced by releasing the clutch serving as the power connecting/disconnecting device to carry out the traveling through inertia not only when the accelerator opening is fully closed but also when the accelerator opening is equal to or smaller than a predetermined opening. Furthermore, in the technique disclosed in International Publication Pamphlet No. WO 2013/030920, the travelling through inertia can be carried out even when a constant-speed travelling can be performed.

In this type of technique, the travelling through inertia is terminated under a predetermined condition, and the power connecting/disconnecting device is engaged to return to a normal travelling. For example, in the technique disclosed in Japanese Patent Application Laid-open No. 2012-030710, when the accelerator opening becomes equal to or smaller than a threshold value (value assumed as fully closed) during the traveling through inertia, the travelling through inertia is terminated and the clutch is engaged so that the engine brake can be actuated. Thus, when the accelerator opening is fully closed during the traveling through inertia, the vehicle deceleration rapidly increases from the vehicle deceleration during the traveling through inertia to the vehicle deceleration by the engine brake, and such difference in the levels of the vehicle deceleration may give a sense of discomfort to the driver. To solve this problem, the difference in the levels of the vehicle deceleration can be made smaller by slidably engaging the clutch in returning to the normal travelling. However, such a measure against the difference may lower the durability of the clutch.

There is a need for a control device for a vehicle and a method of controlling a vehicle that can suppress the fluctuation of the vehicle deceleration while avoiding the lowering of the durability of the power connecting/disconnecting device.

SUMMARY OF THE INVENTION

It is an object of the present invention to at least partially solve the problems in the conventional technology.

According to one aspect of the present invention, there is provided a control device for a vehicle including an engine, drive wheels, a power connecting/disconnecting device disposed between the engine and the drive wheels, the control device including a control unit configured to: implement a first travelling mode of engaging the power connecting/disconnecting device during travelling at a time an accelerator opening is greater than a fully closed state and not greater than a first opening; implement a second travelling mode of releasing the power connecting/disconnecting device during the travelling at a time the accelerator opening is greater than the first opening and smaller than a second opening; implement a third travelling mode of stopping a fuel supply to the engine with the power connecting/disconnecting device engaged during the travelling at a time the accelerator opening is fully closed; and control an output of the engine so that a vehicle deceleration at a time of implementing the first travelling mode gradually changes between a vehicle deceleration at a time of switching from the second travelling mode to the first travelling mode and a vehicle deceleration in the third travelling mode.

According to another aspect of the present invention, there is provided a method of controlling a vehicle including an engine, drive wheels, a power connecting/disconnecting device disposed between the engine and the drive wheels, and a control unit, the control method including the steps of: implementing a first travelling mode of engaging the power connecting/disconnecting device at a time an accelerator opening during travelling is greater than a fully closed state and not greater than a first opening; implementing a second travelling mode of releasing the power connecting/disconnecting device at a time the accelerator opening during the travelling is greater than the first opening and smaller than a second opening; and implementing a third travelling mode of stopping a fuel supply to the engine with the power connecting/disconnecting device engaged at a time the accelerator opening during the travelling is fully closed, wherein in the step of implementing the first travelling mode, an output of the engine is controlled to gradually change a vehicle deceleration at a time of implementing the first travelling mode between a vehicle deceleration at a time of switching from the second travelling mode to the first travelling mode and a vehicle deceleration in the third travelling mode.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT(S)

An embodiment of a control device for a vehicle and a method of controlling a vehicle according to the present invention will be hereinafter described in detail based on the drawings. The embodiment does not limit the present invention.

An embodiment of the control device for the vehicle and the method of controlling the vehicle according to the present invention will be described based on FIGS. 1 to 4.

First, an embodiment of a vehicle to which the control device for the vehicle and the method of controlling the vehicle are to be applied will be described.

Figure 1:
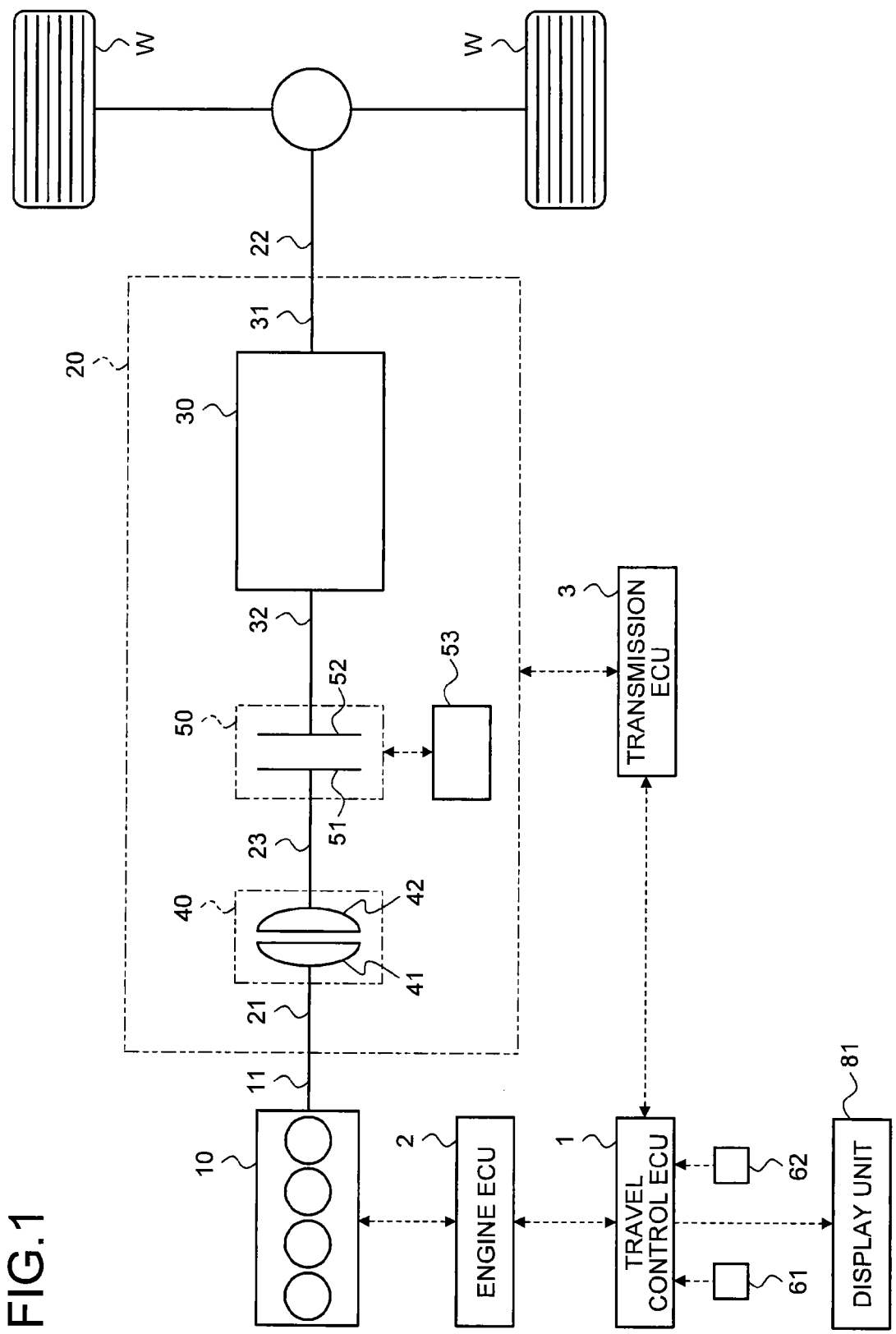
FIG. 1 is a view illustrating a control device for a vehicle and a method of controlling the vehicle according to the present invention and a vehicle to which the device and method are to be applied.

As illustrated in FIG. 1, the vehicle illustrated herein includes an engine 10 serving as a power source, and an automatic transmission 20 that transmits the power of the engine 10 toward drive wheels W.

Furthermore, the vehicle includes, as a control device for the vehicle, an electronic control device (hereinafter referred to as "travel control ECU") 1 that carries out a control associated with the traveling of the vehicle, an electronic control device (hereinafter referred to as "engine ECU") 2 that carries out a control of the engine 10, and an electronic control device (hereinafter referred to as "transmission ECU") 3 that carries out a control of the automatic transmission 20. The travel control ECU 1, the engine ECU 2, and the transmission ECU 3 include various computation processing functions to be carried out by a control unit of the control device for the vehicle, as will be described later. The travel control ECU 1 exchanges detection information of the sensor, computation processing result, and the like with the engine ECU 2 and the transmission ECU 3. The travel control ECU 1 also gives a command to the engine ECU 2 and the transmission ECU 3 to causes the engine ECU 2 to perform the control of the engine 10 according to the command and to cause the transmission ECU 3 to perform the control of the automatic transmission 20 according to the command.

The engine 10 is, for example, an internal combustion engine, and causes an engine rotation shaft 11 to generate power with the supplied fuel.

The automatic transmission 20 mounted on the vehicle includes, for example, not only a general stepped automatic transmission and a continuously variable automatic transmission, but also a dual clutch transmission (DCT), a stepped manual transmission (MMT: multimode manual transmission) that can automatically shift gears, and the like, as devices covered under the application.

The automatic transmission 20 of the present embodiment includes a transmission main body 30 serving as an automatic gear-shift unit, and a torque converter 40 for transmitting the power of the engine 10 to the transmission main body 30.

In the automatic transmission 20, a transmission input shaft 21 is coupled to the engine rotation shaft 11, and a transmission output shaft 22 is coupled to the drive wheels W side. The transmission input shaft 21 is connected to rotate integrally with a pump impeller 41 of the torque converter 40. An intermediate shaft 23 is connected to rotate integrally with a turbine runner 42 of the torque converter 40. The transmission output shaft 22 is connected to a rotation shaft 31 on the drive wheels W side of the transmission main body 30. The torque converter 40 may include a lockup clutch.

Furthermore, the vehicle includes a power connecting/disconnecting device 50 disposed between the engine 10 and the drive wheels W (i.e., on power transmission path of the power output from the engine 10) to enable transmission and blocking of the power between the engine 10 and the drive wheels W.

The power connecting/disconnecting device 50 includes a first engagement unit 51 and a second engagement unit 52 connected to the engine 10 side and the drive wheels W side, respectively, on the power transmission path. The power connecting/disconnecting device 50 enables power transmission between the engine 10 and the drive wheels W in an engaged state in which the first engagement unit 51 and the second engagement unit 52 integrally rotate. On the other hand, the power connecting/disconnecting device 50 blocks the power transmission between the engine 10 and the drive wheels W in a released state in which the first engagement unit 51 and the second engagement unit 52 are separated and rotate separately.

The power connecting/disconnecting device 50 causes an actuator 53 to perform an engaging operation or a releasing operation between the first engagement unit 51 and the second engagement unit 52. The actuator 53 controls a connected state and a separated state between the first engagement unit 51 and the second engagement unit 52.

In the vehicle, the power can be transmitted between the engine 10 and the drive wheels W during the travelling or the power transmission can be blocked during the travelling by controlling the power connecting/disconnecting device 50 during the travelling.

The power connecting/disconnecting device 50 may be newly disposed between the engine 10 and the drive wheels W, or a device disposed between the engine 10 and the drive wheels W for a different purpose may be used as the power connecting/disconnecting device 50. In the illustrated vehicle, the power connecting/disconnecting device 50 is arranged in the automatic transmission 20. Herein, the power connecting/disconnecting device for controlling the automatic transmission 20 to a neutral state is used as the power connecting/disconnecting device 50 of the present embodiment. For example, if the automatic transmission 20 is a general stepped automatic transmission, at least one of a plurality of power connecting/disconnecting devices (clutch and brake) arranged in the transmission main body 30 is used as the power connecting/disconnecting device 50. Alternatively, if the automatic transmission 20 is a belt type continuously variable automatic transmission, for example, a clutch (so-called starting clutch) of a forward/backward movement switching mechanism disposed between the torque converter 40 and the transmission main body 30 may be used as the power connecting/disconnecting device 50.

In FIG. 1, a case of a continuously variable automatic transmission is described by way of example. The first engagement unit 51 is connected to the intermediate shaft 23. The second engagement unit 52 is connected to a rotation shaft 32 on the engine 10 side of the transmission main body 30. The power connecting/disconnecting device 50 in this case is a friction clutch in which a friction material is arranged on at least one of the first engagement unit 51 or the second engagement unit 52. Hereinafter, the power connecting/disconnecting device 50 is referred to as a clutch 50. The clutch 50 supplies hydraulic oil to at least one of the first engagement unit 51 or the second engagement unit 52 so that the first engagement unit 51 and the second engagement unit 52 are brought into contact to the engaged state. On the other hand, the clutch discharges the supplied hydraulic oil so that the first engagement unit 51 and the second engagement unit 52 separate to the released state. The actuator 53 includes, for example, an electromagnetic valve (not illustrated), and adjusts the supplying oil pressure of the hydraulic oil to the clutch 50 with an opening/closing operation of the electromagnetic valve by a clutch control unit (power connecting/disconnecting control unit) of the transmission ECU 3. The clutch control unit (power connecting/disconnecting control unit) operates as a control unit of the control device for the vehicle.

The computation process of the control device for the vehicle will now be described.

The control unit in the control device for the vehicle includes a first travelling mode of engaging the clutch 50 during the travelling, a second travelling mode of releasing the clutch 50 during the travelling, and a third travelling mode of stopping the fuel supply to the engine 10 with the clutch 50 engaged during the travelling. The first travelling mode is a travelling mode in the normal travelling to be described later. The second travelling mode is a travelling mode in the inertia travelling to be described later. The third travelling mode is a travelling mode at the time of a fuel cut control in which the fuel supply to the engine 10 is stopped in the normal travelling.

The vehicle of the present embodiment can block the power transmission between the engine 10 and the drive wheels W and travel through inertia (inertia travelling) by releasing the clutch 50. Thus, the travel control ECU 1 includes an inertia control unit for executing a control associated with the inertia control (hereinafter referred to as "inertia control"). The inertia control unit blocks the power transmission between the engine 10 and the drive wheels W during the travelling by sending a command to the transmission ECU 3 to release the clutch 50 during the normal travelling. The normal travelling refers to a state of travelling followed by engaging the clutch 50 and enabling power transmission between the engine 10 and the drive wheels W. The normal travelling is performed by a normal travelling control unit of the travel control ECU 1. The inertia control unit and the normal travelling control unit respectively operate as a control unit of the control device for the vehicle.

Specifically, the illustrated vehicle can perform a neutral inertia travelling (hereinafter referred to as "N inertia travelling") for the inertia travelling. The N inertia travelling is the inertia travelling in which the power transmission between the engine 10 and the drive wheels W is blocked with the engine 10 remained actuated. Thus, the inertia control unit releases the clutch 50 when the implementing conditions of the N inertia travelling are met. The inertia control unit operates the engine 10 at an idle rotation speed during the N inertia travelling. The inertia control unit performs a control (hereinafter referred to as "N inertia control") associated with the N inertia travelling.

Figure 2:
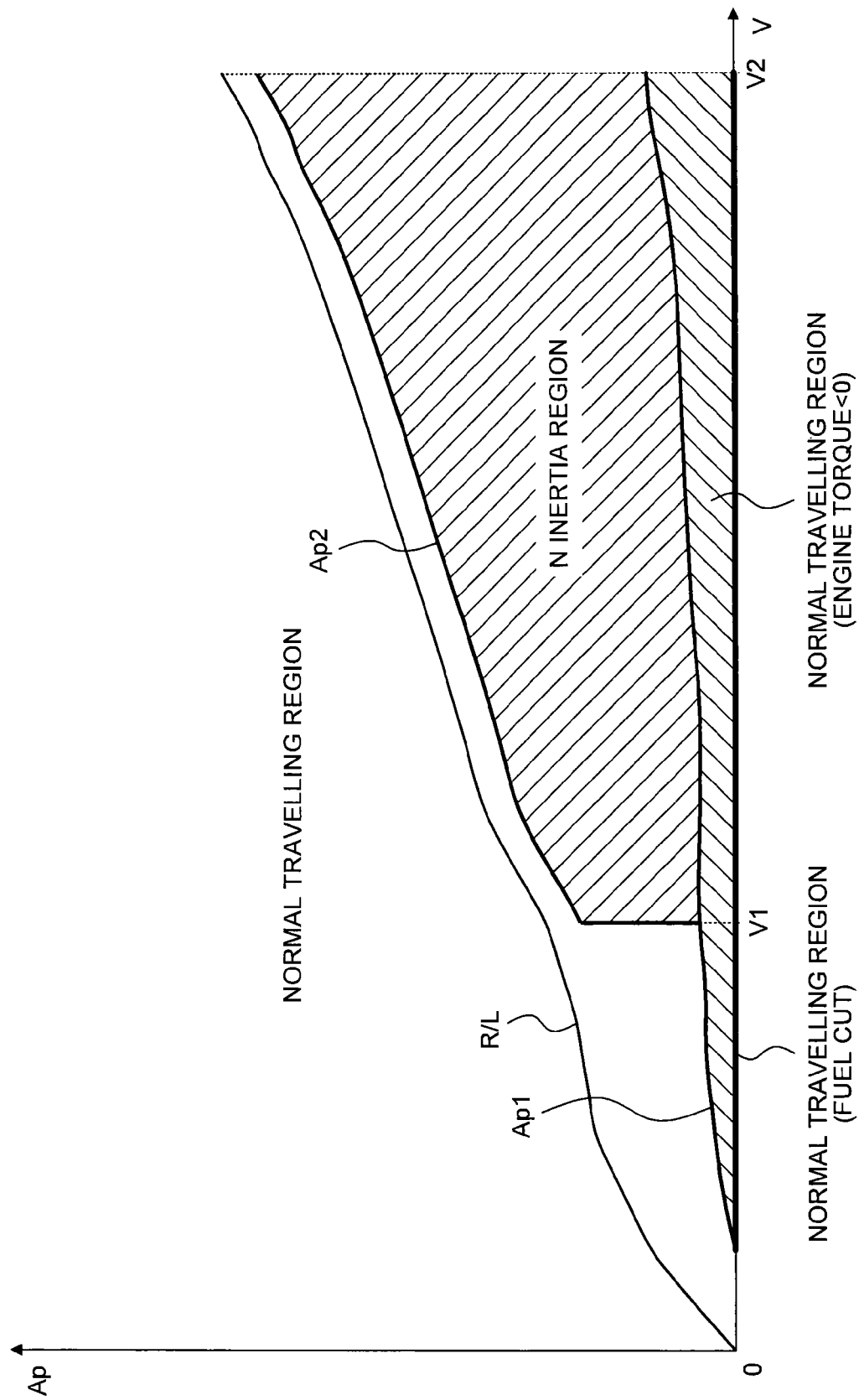
FIG. 2 is a view describing an N inertia region.

As illustrated in FIG. 2, in the present embodiment, a first opening Ap1 and a second opening Ap2 defining an N inertia region are set. The first opening Ap1 is a maximum value of an accelerator opening Ap for every vehicle speed V when the output torque (engine torque) of the engine 10 is negative. The second opening Ap2 is an accelerator opening Ap for every vehicle speed V lower than an accelerator opening necessary for maintaining a constant-speed travelling by a predetermined value (second predetermined value). The accelerator opening for every vehicle speed V necessary for maintaining the constant-speed travelling is the accelerator opening Ap balanced with a road load line (R/L line) at which the constant speed travelling can be carried out for every vehicle speed V. Even when carrying out the accelerator operation to aim for the constant-speed travelling, the driver may possibly shift the accelerator opening Ap with respect to a target accelerator opening in this case. Furthermore, even when operating the accelerator opening Ap to the target accelerator opening, the driver may subconsciously shift the accelerator opening Ap from the target accelerator opening. Thus, the second predetermined value is to be set to a value into which such a shift amount of the accelerator opening Ap has been numerically converted in advance. That is, the second predetermined value is set to a magnitude that allows the accelerator opening Ap made by the driver aiming for the constant-speed travelling to be prevented from entering the N inertia region unintendedly. Thus, if the accelerator opening Ap is greater than the first opening Ap1 and smaller than the second opening Ap2, the implementation of the N inertia travelling is permitted.

In the present embodiment, however, a lower limit vehicle speed V1 and an upper limit vehicle speed V2 defining the N inertia region are also set in addition to the first opening Ap1 and the second opening Ap2 defining the N inertia region, as illustrated in FIG. 2. During the N inertia travelling, it becomes more difficult to obtain a sufficient vehicle deceleration as the vehicle speed V is lower. The sufficient vehicle deceleration is determined according to the target user of the vehicle, and the like, for example. Thus, in the illustration, the lower limit value of the vehicle speed V at which the desired vehicle deceleration can be generated by the N inertia travelling is set to the lower limit vehicle speed V1. In the N inertia travelling, the vehicle deceleration becomes larger since the vehicle travelling resistance becomes larger as the vehicle speed V is higher. Thus, in the high speed region in which the vehicle deceleration becomes greater than the predetermined value (first predetermined value), the lowering of the vehicle speed V involved in the N inertia travelling is larger compared to the region of lower vehicle speed V, and the speed may decelerate immediately to the vehicle speed V0 for returning from the N inertia travelling to the normal travelling. Thus, in the illustration, the vehicle speed V of when the vehicle deceleration is the first predetermined value is set to the upper limit vehicle speed V2.

Thus, the N inertia travelling is executed when the combination of the vehicle speed V and the accelerator opening Ap is in the N inertia region. Therefore, the travelling mode adjustment unit of the travel control ECU 1 determines that the combination of the vehicle speed V and the accelerator opening Ap is in the N inertia region when the vehicle speed V is equal to or higher than the lower limit vehicle speed V1 and equal to or lower than the upper limit vehicle speed V2 (V1≤V≤V2) and when the accelerator opening Ap is greater than the first opening Ap1 and smaller than the second opening Ap2 (Ap1<Ap<Ap2). Thus, the travelling mode adjustment unit selects the N inertia travelling mode and permits the implementation of the N inertia travelling. If the implementation of the N inertia travelling is permitted, the inertia control unit implements the N inertia control and causes the vehicle to carry out the N inertia travelling. If the accelerator opening Ap is changing in the opening direction although the combination of the vehicle speed V and the accelerator opening Ap is in the N inertia region, the vehicle is desirably acceleration traveled in the normal travelling mode. Therefore, the travelling mode adjustment unit selects the N inertia travelling mode and permits the implementation of the N inertia travelling when the combination of the vehicle speed V and the accelerator opening Ap is in the N inertia region and the changing amount of the accelerator opening Ap (hereinafter referred to as "accelerator opening changing amount") dAp is indicating constant-speed travelling or deceleration travelling. The travelling mode adjustment unit prohibits the implementation of the N inertia travelling and permits the implementation of the normal travelling mode if the accelerator opening changing amount dAp is indicating acceleration travelling (i.e., if the accelerator opening changing amount dAp is indicating acceleration travelling during the inertia travelling) even if the combination of the vehicle speed V and the accelerator opening Ap is in the N inertia region. In other words, in this case, the clutch 50 is engaged in the normal travelling mode and the acceleration travelling is carried out. The travelling mode adjustment unit determines whether or not to implement the N inertia travelling in such manner. The travelling mode adjustment unit operates as a control unit of the control device for the vehicle.

The vehicle deceleration varies depending on the vehicle travelling resistance even if the combination of the vehicle speed V and the accelerator opening Ap are the same. Thus, the threshold values (lower limit vehicle speed V1, upper limit vehicle speed V2, first opening Ap1, second opening Ap2) defining the N inertia region are desirably changed according to the vehicle travelling resistance. The vehicle travelling resistance changes according to the number of passengers and the load capacity. Thus, the control device for the vehicle and the method of controlling the vehicle can set the appropriate N inertia region corresponding to the number of passengers and the load capacity.

The illustrated vehicle can implement the fuel cut control of stopping the fuel supply to the engine 10 during the normal travelling. The travelling mode adjustment unit or the normal travelling control unit permits the implementation of the fuel cut control and sends a command to implement the fuel cut control to the fuel cut control unit of the travel control ECU 1 when the implementing conditions of the fuel cut control are met (when accelerator opening Ap is fully closed, as will be described later). The fuel cut control unit operates as the control unit of the control device for the vehicle. The fuel cut control is a control implemented in the normal travelling mode. Thus, the fuel cut control unit sends the command to implement the fuel cut control to the engine ECU 2 in the travelling state in which the clutch 50 is engaged. The engine ECU 2 stops the fuel supply to the engine 10 based on the command. Thus, the power transmission between the engine 10 and the drive wheels W is enabled during the fuel cut control, whereby the vehicle deceleration by the engine brake occurs. The fuel cut control unit may send an engagement command of the clutch 50 to the transmission ECU 3 instead of the normal travelling control unit to engage the clutch 50 in the released state if not returned from the N inertia travelling to the normal travelling when the implementing condition of the fuel cut control is met.

The travelling mode adjustment unit prohibits the implementation of the N inertia travelling and the fuel cut control and permits the implementation of the normal travelling when the accelerator opening Ap is greater than a fully closed state and is equal to or smaller than the first opening Ap1 ($0 < Ap \leq Ap1$). If the accelerator opening Ap is greater than the first opening Ap1, the vehicle deceleration by the N inertia travelling occurs. If the accelerator opening Ap is fully closed, the vehicle deceleration, which is greater than the deceleration during the N inertia travelling, occurs with the engine brake by the fuel cut control. Thus, when the accelerator opening Ap is greater than the fully closed state and equal to or smaller than the first opening Ap1 (i.e., when the engine torque is in the negative region), the normal travelling control unit performs the output control of the engine to gradually change the vehicle deceleration in the normal travelling between the vehicle deceleration in the N inertia travelling of when switching from the N inertia travelling to the normal travelling and the vehicle deceleration in the fuel cut control. When the accelerator opening Ap is thereby reduced toward fully closed during the N inertia travelling, the difference in the levels of the vehicle deceleration is suppressed from occurring until the accelerator opening Ap is fully closed.

The travelling mode adjustment unit prohibits the implementation of the N inertia travelling and the fuel cut control and permits the implementation of the normal travelling even when the accelerator opening Ap is equal to or greater than the second opening Ap2 ($Ap \geq Ap2$). Since a difference worth a second predetermined value described above is provided between the target accelerator opening by the driver aiming for constant-speed travelling and the second opening Ap2, the travelling mode adjustment unit can avoid the implementation of the N inertia travelling and the fuel control even if the accelerator opening Ap is subconsciously shifted with respect to the target accelerator opening.

Figure 3:
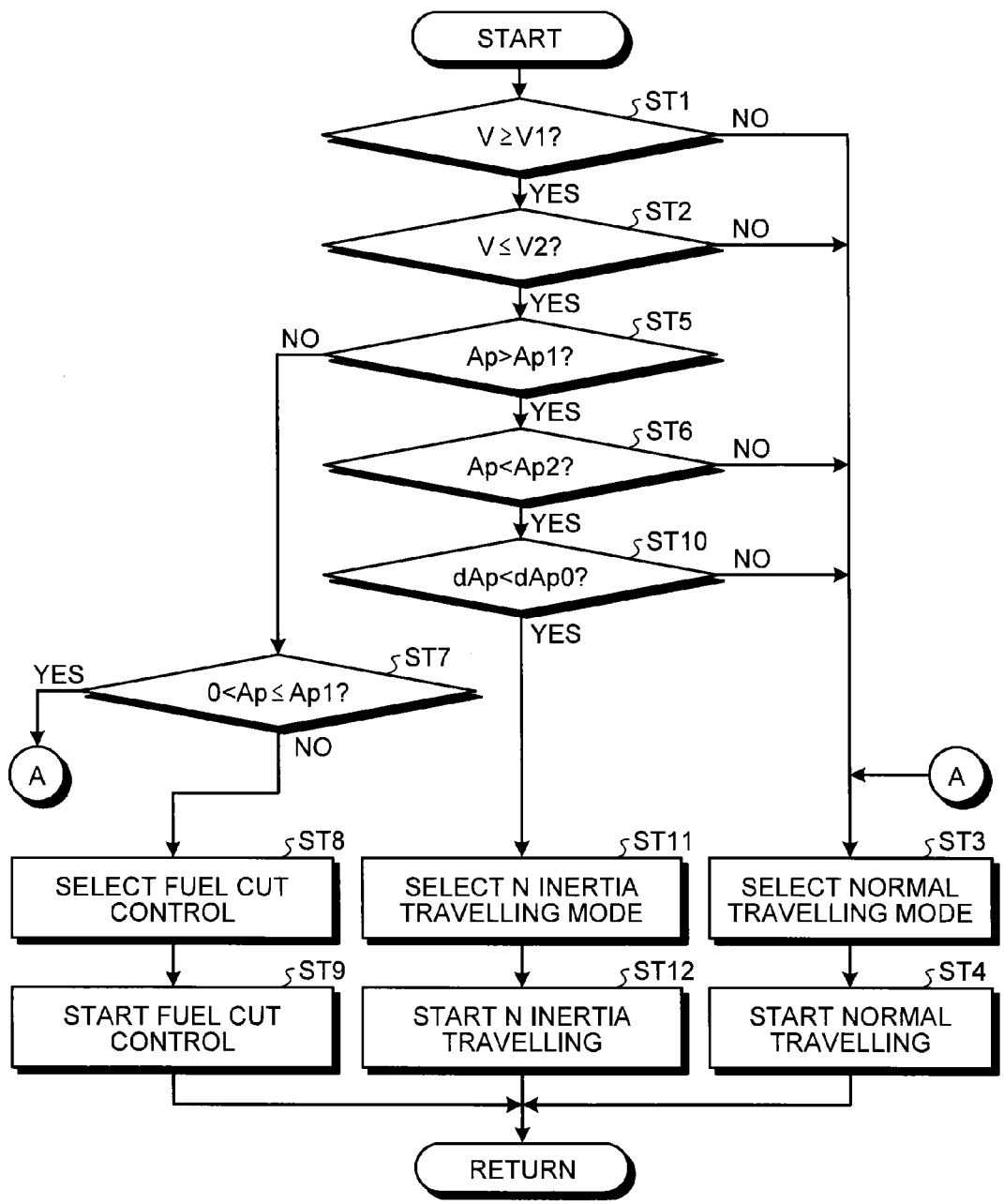
FIG. 3 is a flowchart describing a setting of a travelling mode in the control device for the vehicle and the method of controlling the vehicle according to the present invention.

The computation processing operation of the control device for the vehicle and the method of controlling the vehicle will now be described based on the flowchart of FIG. 3.

The travelling mode adjustment unit determines whether or not the vehicle speed V detected by a vehicle speed sensor 61 is equal to or higher than the lower limit vehicle speed V1 (step ST1). If the vehicle speed V is equal to or higher than the lower limit vehicle speed V1, the travelling mode adjustment unit determines whether or not the vehicle speed V is equal to or lower than the upper limit vehicle speed V2 (step ST2).

The travelling mode adjustment unit prohibits the implementation of the N inertia travelling, permits the implementation of the normal travelling, and selects the normal travelling mode if the vehicle speed V is lower than the lower limit vehicle speed V1 or higher than the upper limit vehicle speed V2 (step ST3). In such cases, the normal travelling control unit starts the normal travelling (step ST4). The travelling mode adjustment unit then returns to step ST1.

If the vehicle speed V is equal to or higher than the lower limit vehicle speed V1 and equal to or lower than the upper limit vehicle speed V2, the travelling mode adjustment unit determines whether or not the accelerator opening Ap detected by an accelerator opening sensor 62 is greater than the first opening Ap1 (step ST5). If the accelerator opening Ap is greater than the first opening Ap1, the travelling mode adjustment unit determines whether or not the accelerator opening Ap is smaller than the second opening Ap2 (step ST6).

If the accelerator opening Ap is equal to or smaller than the first opening Ap1, the travelling mode adjustment unit determines whether or not the accelerator opening Ap is greater than zero and equal to or smaller than the first opening Ap1 (step ST7).

If the accelerator opening Ap is greater than zero and equal to or smaller than the first opening Ap1, the travelling mode adjustment unit proceeds to step ST3 and selects the normal travelling mode. On the other hand, if the accelerator opening Ap is greater than zero and not equal to or smaller than the first opening Ap1 (i.e., if the accelerator opening Ap is zero), the travelling mode adjustment unit permits the implementation of the fuel cut control and selects the fuel cut control in the normal travelling mode (step ST8). The fuel cut control unit then starts the fuel cut control (step ST9). Thereafter, the travelling mode adjustment unit returns to step ST1.

If the accelerator opening Ap is equal to or greater than the second opening Ap2, the travelling mode adjustment unit proceeds to step ST3 and selects the normal travelling mode. In this case, the travelling mode adjustment unit prohibits the implementation of the N inertia travelling and the fuel cut control and permits the implementation of the normal travelling, as described above. Thus, for example, if the driver is carrying out the accelerator operation to the target accelerator opening (=second opening Ap2+second predetermined value) aiming for the constant-speed travelling, the normal travelling control unit implements the constant-speed travelling by the normal travelling to avoid the implementation of the N inertia travelling and the fuel cut control, so that the generation of the vehicle deceleration by the N inertia travelling and the fuel cut control can be suppressed. Thus, the control device for the vehicle and the method of controlling the vehicle can suppress the sense of discomfort of the driver.

If the accelerator opening Ap is greater than the first opening Ap1 and smaller than the second opening Ap2, the travelling mode adjustment unit determines whether or not the accelerator opening changing amount dAp is smaller than a predetermined value dAp0 (>0) (step ST10). The predetermined value dAp0 is a threshold value for determining whether or not the driver is requesting for the acceleration travelling of the vehicle by the accelerator operation and is a value substantially close to zero. If the accelerator opening changing amount dAp is equal to or greater than the predetermined value dAp0, it is determined that the driver is requesting for the acceleration travelling of the vehicle. If, on the other hand, the accelerator opening changing amount dAp is smaller than the predetermined value dAp0 (includes when accelerator opening changing amount dAp is zero or negative), it is determined that the driver is not requesting for the acceleration travelling of the vehicle but is requesting for the constant-speed travelling or the deceleration travelling. In step ST10, whether or not the accelerator opening changing amount per unit time is smaller than the predetermined value may be determined to determine whether or not the driver is requesting for the acceleration travelling of the vehicle by the quick depression of the accelerator pedal.

If the accelerator opening changing amount dAp is equal to or greater than the predetermined value dAp0, the travelling mode adjustment unit proceeds to step ST3 and selects the normal travelling mode since the combination of the vehicle speed V and the accelerator opening Ap is in the N inertia region but the acceleration travelling is being requested.

Meanwhile, if the accelerator opening changing amount dAp is smaller than the predetermined value dAp0, the travelling mode adjustment unit permits the implementation of the N inertia travelling and selects the N inertia travelling mode (step ST11). The inertia control unit starts the N inertia travelling (step ST12). Thereafter, the travelling mode adjustment unit returns to step ST1.

When the accelerator opening Ap is reduced during the N inertia travelling, the accelerator opening Ap is determined to be equal to or smaller than the first opening Ap1 in step ST5, and furthermore, the accelerator opening Ap is determined to be greater than zero and equal to or smaller than the first opening Ap1 in step ST7, the travelling mode adjustment unit proceeds to step ST3 and selects the normal travelling mode, as described above. In this case, the normal travelling control unit gradually changes the vehicle deceleration in the normal travelling between the vehicle deceleration in the N inertia travelling of when switching from the N inertia travelling to the normal travelling and the vehicle deceleration in the fuel cut control. The normal travelling control unit thus estimates the output torque of the engine 10 for every accelerator opening Ap for realizing such vehicle deceleration from the map, and the like, and causes the engine ECU 2 to perform the output control of the engine 10 corresponding to the output torque. Thus, the occurrence of a difference in the levels of the vehicle deceleration is suppressed when switching the N inertia travelling or the fuel cut control and the normal travelling, and thus the sense of discomfort of the driver can be suppressed. Thus, the control device for the vehicle and the method of controlling the vehicle do not use the sliding of the clutch 50 for the adjustment of the vehicle deceleration at the time of the normal travelling, and thus can suppress the fluctuation in the vehicle deceleration of when the accelerator opening is reduced until the travelling mode is switched during the N inertia travelling, while avoiding the lowering of the durability of the clutch 50.

If the accelerator opening changing amount dAp is smaller than the predetermined value dAp0 during the N inertia travelling, the travelling mode adjustment unit continues the N inertia travelling. If, on the other hand, the accelerator opening changing amount dAp becomes equal to or greater than the predetermined value dAp0 during the N inertia travelling, the travelling mode adjustment unit prohibits the N inertia travelling even in the N inertia region, selects the normal travelling mode, and returns the travelling mode from the N inertia travelling to the normal travelling. If such prohibiting control is not performed, the N inertia travelling is continued until the combination of the vehicle speed V and the accelerator opening Ap is outside the N inertia region. Thus, the control device for the vehicle and the method of controlling the vehicle prohibit the N inertia travelling upon detection of the acceleration intention of the driver, and return the travelling mode from the N inertia travelling to the normal travelling, so that the vehicle can be accelerated with satisfactory responsiveness and the sense of discomfort of the driver can be suppressed.

As previously described, the vehicle deceleration by the N inertia travelling is not sufficiently obtained in the region of lower speed than the lower limit vehicle speed V1. Thus, even if the N inertia travelling is executed in such a low speed region, the driver may feel a sense of discomfort in the vehicle deceleration with respect to the driver's accelerator operation. Therefore, in the control device for the vehicle and the method of controlling the vehicle of the present embodiment, the lower limit vehicle speed V1 at which the N inertia travelling is executed is set and the N inertia travelling is prohibited if the speed is lower than the lower limit vehicle speed V1. That is, the control device for the vehicle and the method of controlling the vehicle prevent the releasing operation of the clutch 50 for executing the N inertia travelling and the engaging operation of the clutch 50 for returning from the N inertia travelling to the normal travelling from being frequently carried out in the low speed region. The control device for the vehicle and the method of controlling the vehicle thus can suppress the sense of discomfort of the driver due to insufficiency of vehicle deceleration and the repetition of the engagement and the release of the clutch 50 in the low speed region.

In the region of higher speed than the upper limit vehicle speed V2, the vehicle deceleration is larger compared to the deceleration in the N inertia region and the low speed region, as described above. Thus, if the N inertia travelling is executed in such a high speed region, the N inertia travelling and the normal travelling may be frequently switched. The driver thus may feel a sense of discomfort. Therefore, in the control device for the vehicle and the method of controlling the vehicle of the present embodiment, the upper limit vehicle speed V2 at which the N inertia travelling is executed is set, and the N inertia travelling is prohibited in the speed higher than the upper limit vehicle speed V2. That is, the control device for the vehicle and the method of controlling the vehicle prevent the releasing operation of the clutch 50 for executing the N inertia travelling and the engaging operation of the clutch 50 for returning from the N inertia travelling to the normal travelling from being frequently carried out in the high speed region. The control device for the vehicle and the method of controlling the vehicle thus can suppress a sense of discomfort of the driver due to an excessively large vehicle deceleration and the repetition of the engagement and the release of the clutch 50 in the high speed region.

Thus, the control device for the vehicle and the method of controlling the vehicle can generate the vehicle deceleration of an appropriate magnitude in the low speed region and the high speed region by making the N inertia region appropriate, and can suppress the sense of discomfort of the driver. The control device for the vehicle and the method of controlling the vehicle can also achieve the enlargement of the N inertia region in the vehicle speed region in-between.

Generally, the frequency of travelling with the accelerator opening Ap fully closed is lower during the high speed travelling. Thus, even if it is set such that the N inertia travelling is executed in response to the accelerator (Ap=0) by the driver, the frequency of executing the N inertia travelling is lower in such a vehicle. Conventionally, the setting is made such that the N inertia travelling is executed in the region of the accelerator opening Ap where the engine torque becomes negative. Since the region of such an accelerator opening Ap is narrow, the accelerator operation of the driver attempting to carry out the N inertia travelling is difficult, and the frequency of executing the N inertia travelling is lower in such a vehicle. However, in the control device for the vehicle and the method of controlling the vehicle of the present embodiment, the N inertia travelling mode can be selected at the accelerator opening Ap (Ap1<Ap<Ap2) that is frequently used by the driver corresponding to the vehicle speed V. Thus, the control device for the vehicle and the method of controlling the vehicle can select the N inertia travelling mode with an easy accelerator operation of the driver, so that the frequency the N inertia travelling is executed can be raised and the fuel efficiency can be improved than the prior art.

In the control device for the vehicle and the method of controlling the vehicle of the present embodiment, when decelerating the vehicle, the fuel cut control in the normal travelling mode is selected when the accelerator opening Ap is fully closed (Ap=0), the N inertia travelling mode is selected at the accelerator opening Ap (Ap1<Ap<Ap2) that is frequently used by the driver corresponding to the vehicle speed V, and the normal travelling mode is selected at the accelerator opening Ap (0<Ap≤Ap1) in-between when the engine torque becomes negative. Thus, the control device for the vehicle and the method of controlling the vehicle can use, depending on a purpose, the deceleration by the engine brake of the fuel cut control, the deceleration by the engine brake in the region of negative engine torque, and the deceleration by the N inertia travelling in a state close to the road load state, in accordance with the accelerator opening Ap.

In the control device for the vehicle and the method of controlling the vehicle of the present embodiment, when the accelerator operation is carried out in the accelerating direction, the N inertia travelling is prohibited, respecting the driver's intention of accelerating the speed even in the N inertia region. If such prohibiting control is not performed, the N inertia travelling is continued until the combination of the vehicle speed V and the accelerator opening Ap deviates from the N inertia region. Thus, the control device for the vehicle and the method of controlling the vehicle of the present embodiment prohibits the N inertia travelling upon detection of the acceleration intention of the driver, and returns the travelling mode from the N inertia travelling to the normal travelling to accelerate the vehicle with satisfactory responsiveness, whereby the sense of discomfort of the driver can be suppressed.

Figure 4:
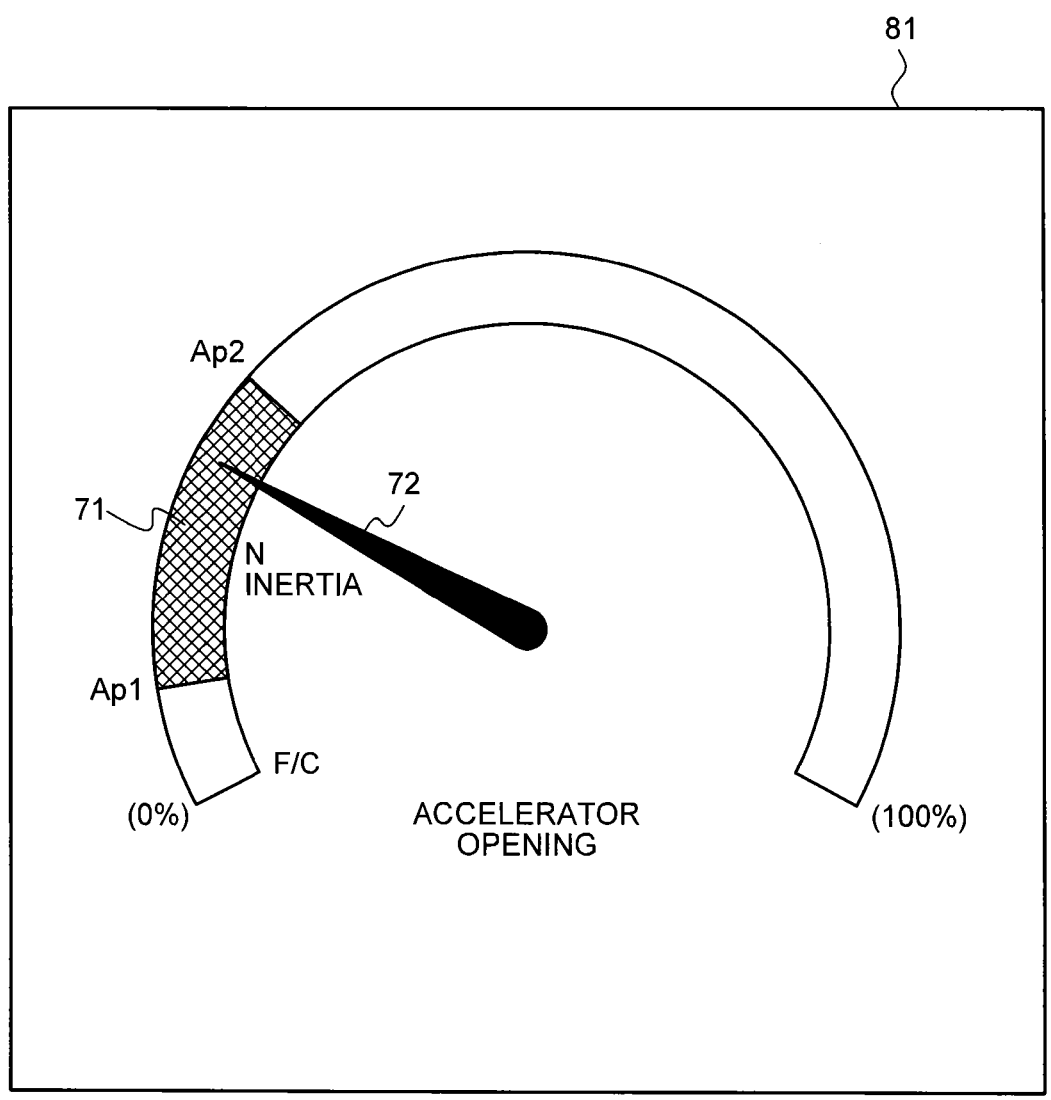
FIG. 4 is a view illustrating an example of displaying an N inertia region to a vehicle compartment.

The control device for the vehicle and the method of controlling the vehicle of the present embodiment present to the driver whether the implementation of the N inertia travelling is possible or not possible in the current state, allowing the driver to perform the N inertia travelling by his/her own will. For example, as illustrated in FIG. 4, the display control unit of the travel control ECU 1 displays the range (Ap1<Ap<Ap2) 71 of the accelerator opening Ap in the N inertia region depending on the vehicle speed V of the current state on a display unit 81 in the vehicle compartment. The display control unit operates as a control unit of the control device for the vehicle. The display unit 81 is, for example, a display region of an instrumental panel, a monitor (monitor of a car navigation system, etc.) arranged around the driver's seat, and the like. The range 71 of the accelerator opening Ap at which the N inertia travelling can be implemented changes according to the vehicle speed V of the current state. The display unit 81 also displays an index 72 representing the accelerator opening Ap of the current state along with the range 71 of the accelerator opening Ap. The range 71 and the index 72 are desirably always displayed in terms of presenting to the driver whether or not the N inertia travelling can be implemented. Such a range 71 may disappear when the accelerator opening Ap of the current state deviates from the relevant range 71, and the deviation from the N inertia region may be more clearly presented to the driver. In the illustration of FIG. 4, the accelerator opening Ap is expressed in percent figures. In the illustration of FIG. 4, the fuel cut region (F/C) of when the accelerator opening Ap is fully closed is also illustrated.

In the present embodiment, the control described above is carried out based on the accelerator opening Ap. The control, however, may be performed using a throttle opening Tap in a unique relationship with the accelerator opening Ap. In this case, the threshold value (the first opening Ap1, the second opening Ap2) in the previous illustration is replaced with a threshold value (a first opening Tap1, a second opening Tap2) of the corresponding throttle opening Tap.

In the present embodiment, the N inertia travelling is described by way of example for the inertia travelling. However, the inertia travelling also includes an inertia travelling in which the power transmission between the engine 10 and the drive wheels W is blocked with the engine 10 stopped (so-called free run travelling). Thus, when the illustrated vehicle carries out the free run travelling, the control where the N inertia travelling described above is replaced with the free run travelling may be performed, and operation effects similar to those described above may be obtained. In such control, "N inertia" in the description made above is deemed to be replaced with "free run". In this case, however, the stop control of the engine 10 is carried out when starting the free run travelling, and the restart control of the engine 10 is added when returning to the normal travelling from the free run travelling.

In the control device for the vehicle and the method of controlling the vehicle according to the embodiment of the present invention, an output of the engine is controlled so that a vehicle deceleration of when performing the first travelling mode gradually changes between a vehicle deceleration of when switching from the second travelling mode to the first travelling mode and a vehicle deceleration in the third travelling mode. Thus, the control device for the vehicle and the method of controlling the vehicle can suppress the occurrence of the difference in the levels of the vehicle deceleration without using the sliding of the power connecting/disconnecting device when switching between the second travelling mode or the third travelling mode and the first travelling mode. Therefore, the control device for the vehicle and the method of controlling the vehicle can suppress the fluctuation of the vehicle deceleration when the accelerator opening is reduced until the travelling mode is switched during the travelling in the second travelling mode, while avoiding the lowering of the durability of the power connecting/disconnecting device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for a vehicle including an engine, drive wheels, a power connecting/disconnecting device disposed between the engine and the drive wheels, the control device comprising:
   a control unit configured to:
      implement a first travelling mode of engaging the power connecting/disconnecting device during travelling at a time an accelerator opening is greater than a fully closed state and not greater than a first opening;
      implement a second travelling mode of releasing the power connecting/disconnecting device during the travelling at a time the accelerator opening is greater than the first opening and smaller than a second opening;
      implement a third travelling mode of stopping a fuel supply to the engine with the power connecting/disconnecting device engaged during the travelling at a time the accelerator opening is fully closed; and
      control an output of the engine so that a vehicle deceleration at a time of implementing the first travelling mode gradually changes between a vehicle deceleration at a time of switching from the second travelling mode to the first travelling mode and a vehicle deceleration in the third travelling mode.

2. The control device according to claim 1, wherein at a time the second opening is an accelerator opening smaller than an accelerator opening necessary for maintaining a constant-speed travelling by a predetermined value, the control unit implements the first travelling mode at a time the accelerator opening is not smaller than the second opening.

3. The control device according to claim 1, wherein the control unit implements the first travelling mode at a time an accelerator opening changing amount is not smaller than a predetermined value.

4. The control device according to claim 2, wherein the control unit implements the first travelling mode at a time an accelerator opening changing amount is not smaller than a predetermined value.

5. A method of controlling a vehicle including an engine, drive wheels, a power connecting/disconnecting device disposed between the engine and the drive wheels, and a control unit, the control method comprising the steps of:
   implementing a first travelling mode of engaging the power connecting/disconnecting device at a time an accelerator opening during travelling is greater than a fully closed state and not greater than a first opening;
   implementing a second travelling mode of releasing the power connecting/disconnecting device at a time the accelerator opening during the travelling is greater than the first opening and smaller than a second opening; and
   implementing a third travelling mode of stopping a fuel supply to the engine with the power connecting/disconnecting device engaged at a time the accelerator opening during the travelling is fully closed, wherein
   in the step of implementing the first travelling mode, an output of the engine is controlled to gradually change a vehicle deceleration at a time of implementing the first travelling mode between a vehicle deceleration at a time of switching from the second travelling mode to the first travelling mode and a vehicle deceleration in the third travelling mode.

* * * * *